E. H. GOODRICH.
CONVERTIBLE AUTOMOBILE BODY.
APPLICATION FILED MAY 26, 1921.

1,437,751.

Patented Dec. 5, 1922.
2 SHEETS—SHEET 2.

INVENTOR.
Etta H. Goodrich.
BY
Bernard C. Becker
ATTORNEY.

Patented Dec. 5, 1922.

1,437,751

UNITED STATES PATENT OFFICE.

ETTA H. GOODRICH, OF NORWICH, NEW YORK.

CONVERTIBLE AUTOMOBILE BODY.

Application filed May 26, 1921. Serial No. 472,942.

*To all whom it may concern:*

Be it known that I, ETTA H. GOODRICH, a citizen of the United States, and a resident of Norwich, county of Chenango, State of New York, have invented certain new and useful Improvements in Convertible Automobile Bodies, of which the following is a specification.

This invention relates to an automobile body in which the seats are convertible in a manner whereby they may be used as a bed.

The object of this invention is to provide a tilting rear seat back for automobile bodies which is adaptable to be fixed in upright position slightly inclined from the vertical, with means for closing the rear end of the body in a manner whereby a substantially vertical rear external surface is obtained.

It will be apparent throughout these specifications and drawing that when this tilting seat back construction is embodied in automobile bodies of the enclosed type, the rear end of the body will necessarily be open when the seat back is in tilted condition and this of course is undesirable; therefore the object of this invention is to provide means adapted to this seat back construction for closing the rear end of the body when the seat back is tilted.

The principal object is to preserve neatness to the automobile body with the desirable feature of tilting the back of the rear seat to horizontal position and provide a continuous flat bed surface without intervening space between the various seat sections.

The nature and scope of this invention will be more fully understood from the following description, taken in connection with the accompanying drawings, forming part hereof, and in which similar numerals refer to similar parts throughout the several views.

Fig. 4 being shown partially in section, taken on line 4—4 of Fig. 3.

Figure 1:
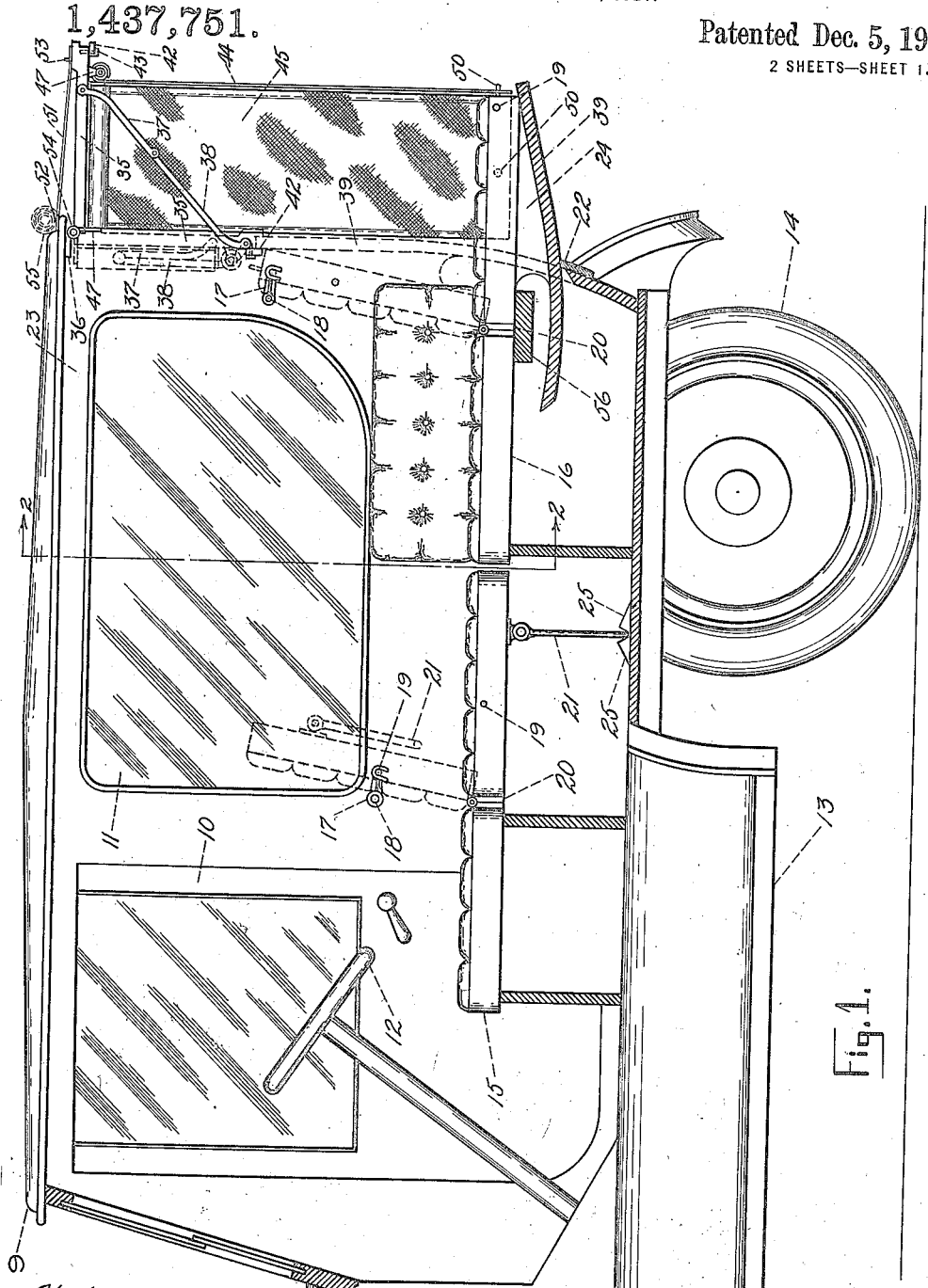
Figure 1 is a side view of the body portion of an automobile shown partially in section and embodies the principal features of this invention.
Figure 2:
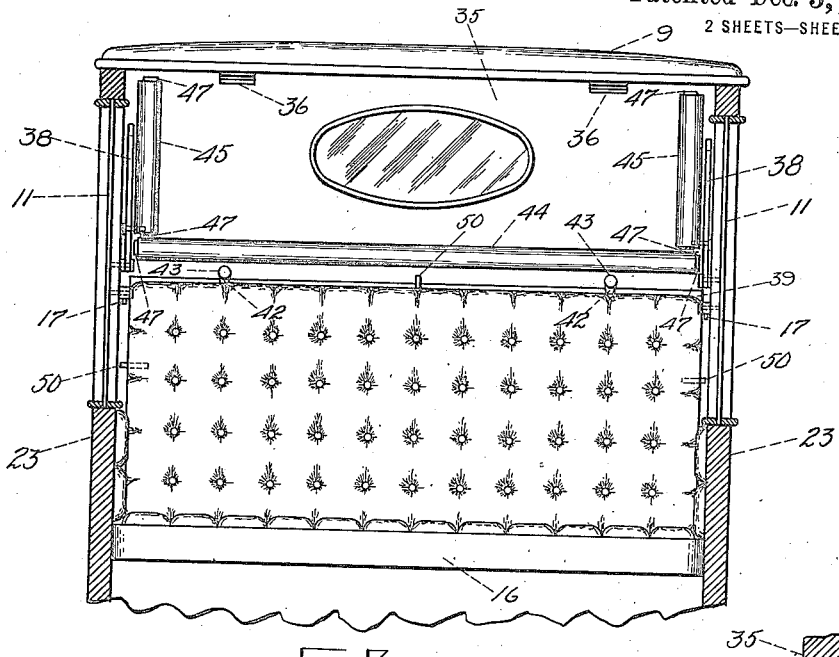
Fig. 2 is an internal rear end view of the automobile body, showing the same in closed condition, and is a sectional view taken on line 2—2 of Fig. 1.

Referring to Figure 1 in which an inclosed type of automobile construction is shown, and where 9 is the roof, 10 is the door, 11 is the window, 12 is the steering wheel, 13 is the running board and 14 the rear wheel.

15 and 16 are front and rear seats respectively, the backs of which are hinged so that they may be placed in horizontal position, as shown by full lines; or they may be fixed in upright position, as shown by dotted lines. When in upright position they are held by the hooks 17 which are mounted free to turn on the pins 18 and engage with the pins 19. The pins 18 may be screwed into the side walls 23 of the automobile body. The backs of each of the seats 15 and 16 are secured thereto by hinges 20. When the back of the rear seat 16 is in horizontal position it is supported by the cross beam 56 and supporting strip 22. The cross beam 56 and supporting strip 22 are firmly fixed to the automobile body in the usual manner, forming a component part thereof.

When the back of the front seat is in horizontal position it is supported by the coat rack 21 as shown by full lines in Fig. 1, and when it is in upright position the coat rack may be placed in the position as shown by dotted lines.

Figures 3, 4, 5, 6, 7, 8:
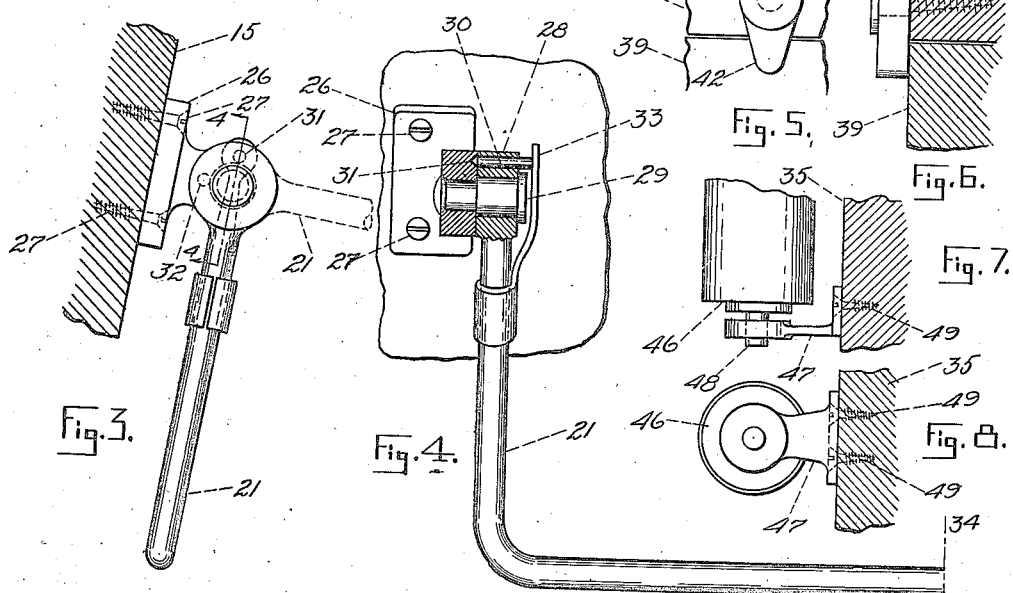
Figs. 3 and 4 are detail drawings of the coat rack.
Figs. 5 and 6 are detail drawings of the latch for holding the upper part of the rear end wall of the body closed.
Figs. 7 and 8 are detail drawings of the hanger for the curtain rollers.

The manner in which this coat rack may be manipulated will be more fully understood by referring to Figs. 3 and 4, which shows an enlarged detail view of a portion of the same, and if shown in complete construction, the form would be symmetrical to the light broken line 34—34.

The coat rack 21 carries a hub 28 which is fitted over the pin 29. The bracket 26 is secured to the back of the seat 15 by wood screws 27, it also carries the pin 29 which is firmly riveted therein, as shown. An engaging pin 30 is free to slide in the hub 28 engaging with either holes 31 or 32 in the bracket 26. The spring 23 normally holds the pin 30 in engagement with either of the holes 31 and 32, viz., when the coat rack is in the position as shown in full lines in Fig. 3, the pin 30 is engaged with the hole 31 and holds the coat rack in this position, it is then identical with the position as shown in dotted lines in Fig. 1, relative to the back of the seat 15. When the coat rack is in the position as shown by dotted lines in Fig. 3, the pin 30 engages with the hole 32, whereby it is held in this position; this position relative to the back of the seat 15, is identical to that shown in full lines in Fig. 1.

To prevent the coat rack 21 from getting out of position when it is supporting the back of the seat 15, the same is engaged between two wedge shaped blocks 25, which are firmly fixed to the floor of the automobile body by wood screws, (not shown) or any method usually employed for such purpose.

Forming a component part of the back of the rear seat 16 is a rear wall portion 39 and is held in proper relation thereto by the filler block 24. When the back of the rear seat 16 is in upright position the rear wall 39 fits neatly between the side walls 23 and closes the lower rear end of the body, as shown by dotted lines in Fig. 1.

To provide a roof extension for the back of the seat 16 when in horizontal position, the upper portion of the rear wall 35 is here shown hinged to the roof 9 by hinges 36, and is supported in open position as shown by the jointed brace rods 37 and 38. When the same is in closed condition the brace rods 37 and 38 are folded as shown by dotted lines, and the rear wall 35 fits neatly with the rear wall 39, both of which are shown in dotted lines. To lock the rear wall 35 in closed condition the same is provided with a latch 42 which is more clearly shown in the enlarged detail views of Figs. 5 and 6. The latch 42 is free to turn on the screw 43 which is screwed into the rear wall 35. By overlapping the rear wall 39 as shown, the latch 42 will lock the rear wall 35 in closed condition.

It is apparent that when the back of the seat 16 is in horizontal position and the rear wall 35 is in open condition, practically the whole rear end of the automobile body is open. For the purpose of closing this rear end I have provided a rear curtain 44 and side curtains 45 which are carried by the rear wall 35 through rollers 46, and brackets 47. An enlarged detail view of roller 46 and bracket 47 are more plainly shown in Figs. 7 and 8, where the bracket 47 is firmly secured to the rear wall 35 by screws 49, and the axle 48 is carried by the roller 46 and free to turn in the brackets 47.

When the curtains 44 and 45 are down and inclosing the extended rear end of the body, they are secured to the back of the rear seat 16 by any usual type of snap fasteners, at the position shown at 50. 51 is a curtain which is firmly fixed to the roof 9 at the point 52, by tacks or any other method usually employed for such a purpose, the free end of this curtain may be fixed to the rear wall 35 by snap fastener 53. The object of this is to prevent water during rainy weather to leak through the crack 54 into the automobile body. When this curtain is not needed the same may be rolled up as indicated at 55 and secured there by straps or any method usually employed for such purpose.

It is to be understood that this invention is not limited to the particular detail construction of the various parts as shown and described, as it is obvious that slight modifications might be made without departing from the nature and scope of this invention.

Having thus described my invention, what I claim, and desire to secure by Letters Patent, is as follows:

1. In combination with an automobile body the rear end thereof being open, of a seat near the rear end of said body, a seat back hinged to said seat, means for locking said seat back in upright position, said upright position being slightly inclined from the vertical, a rear wall section adapted to close the rear end of said body, the same being fixed to the rear side of said seat back in a manner whereby said rear wall is vertical when said seat back is in said inclined upright position, and a stop carried by said body and adapted to support said seat back in horizontal position through said rear wall section.

2. In combination with an automobile body the rear end thereof being open, of a seat near the rear end of said body, a seat back hinged to said seat, means for locking said seat back in upright position, said upright position being slightly inclined from the vertical, and a rear wall section adapted to close the rear end of said body, the same being fixed to the rear side of said seat back in a manner whereby said rear wall is vertical when said seat back is in said inclined upright position.

3. In combination with an automobile body of the enclosed type, the rear end thereof being open, of a seat near the rear end of said body, a seat back hinged to said seat, a wall section adapted to close the lower portion of said open end, means for fixing said wall section to the rear side of said seat back, a second wall section adapted to close the upper portion of said open end and swing out and upward, curtains carried by said second wall section, and means for fixing the ends of said curtains to said seat back.

In testimony whereof I have signed my name to this specification in the presence of two subscribing witnesses.

ETTA H. GOODRICH.

Witnesses:
A. D. BROWN,
O. W. GOODRICH.